(No Model.) 2 Sheets—Sheet 1.

J. T. ANDREW.
DEVICE FOR STARTING RACE HORSES.

No. 543,762. Patented July 30, 1895.

WITNESSES:
John A. Rennie
Fred Acker

INVENTOR
J. T. Andrew
BY
Munn & Co
ATTORNEYS.

(No Model.) 2 Sheets—Sheet 2.

J. T. ANDREW.
DEVICE FOR STARTING RACE HORSES.

No. 543,762. Patented July 30, 1895.

WITNESSES:
John A. Rennie
J. F. de Acker

INVENTOR
J. T. Andrew
BY
Munn & Co.
ATTORNEYS.

United States Patent Office.

JAMES T. ANDREW, OF MONTGOMERY, ALABAMA.

DEVICE FOR STARTING RACE-HORSES.

SPECIFICATION forming part of Letters Patent No. 543,762, dated July 30, 1895.

Application filed October 29, 1894. Serial No. 527,189. (No model.)

*To all whom it may concern:*

Be it known that I, JAMES T. ANDREW, of Montgomery, in the county of Montgomery and State of Alabama, have invented a new and Improved Device for Starting Race-Horses, of which the following is a full, clear, and exact description.

My invention relates to a device for starting race-horses, and it has for its object to provide one or a number of stalls, each stall being adapted to accommodate a horse, and to provide means whereby the stalls may be thrown open simultaneously, and whereby further the horses confined therein will be urged to depart upon the opening of the gates.

Another object of the invention is to provide a device of the above-described character which may be conveniently handled on a race-track and be readily taken out of the way when not required.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
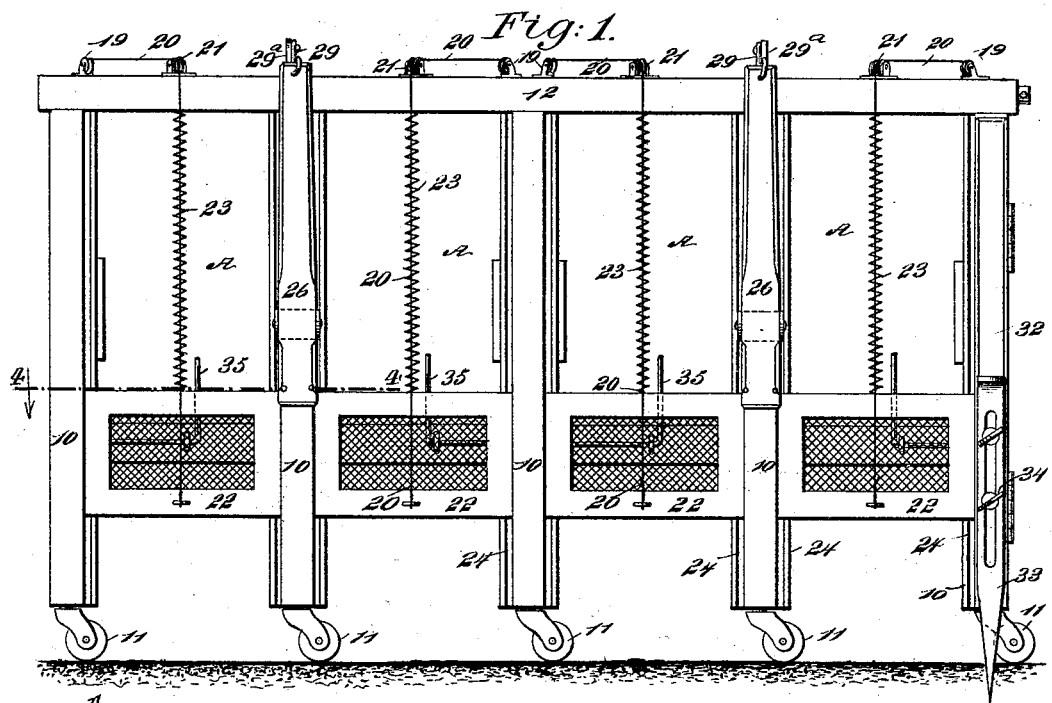
Figure 2:
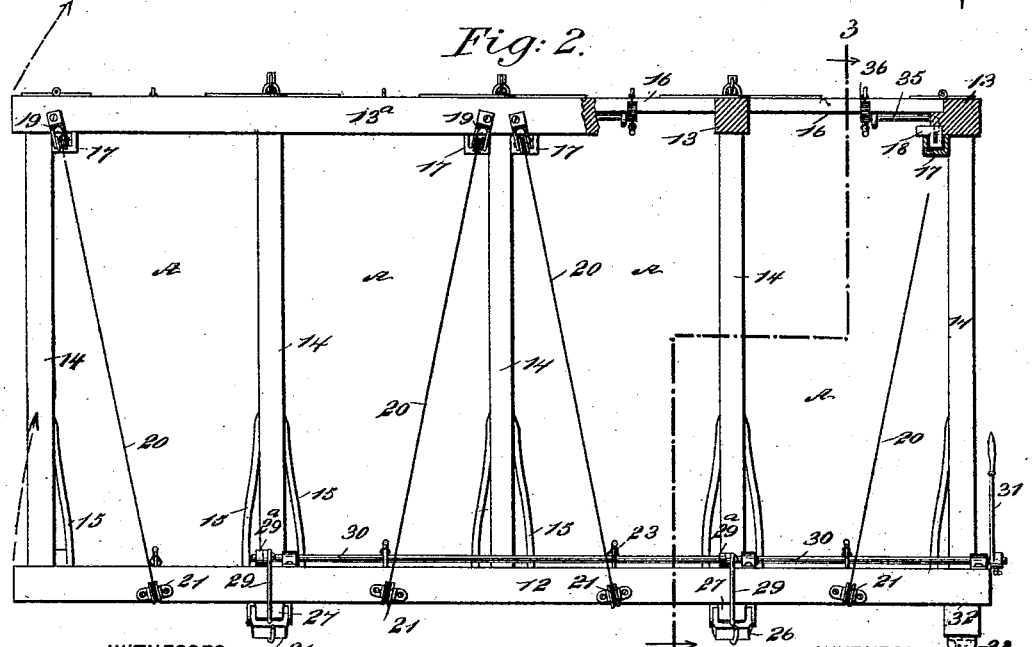
Figure 3:
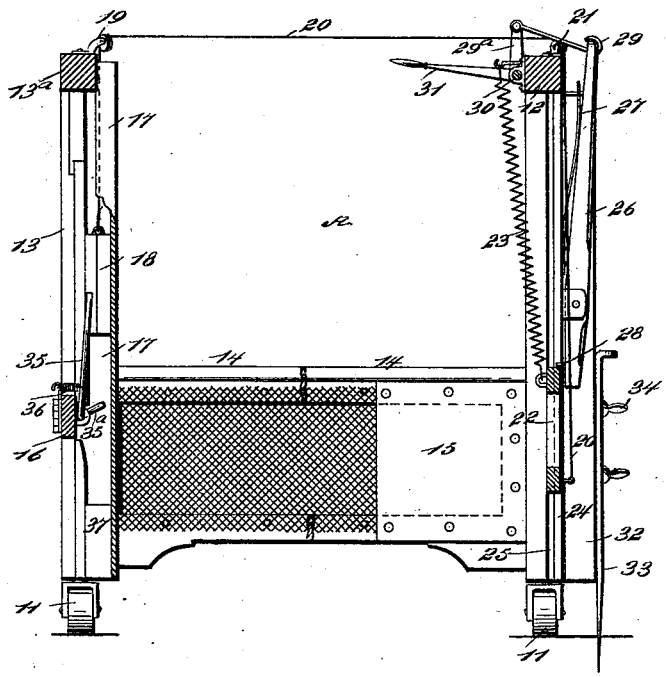
Figure 4:
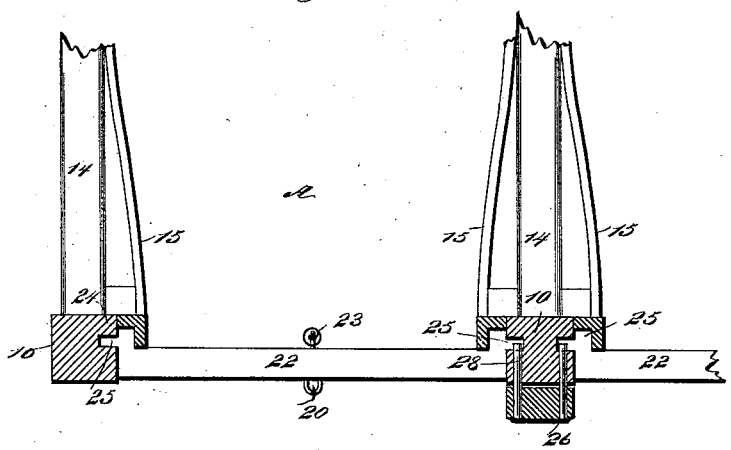

Figure 1 is a front elevation of the device. Fig. 2 is a plan view thereof, a portion of the frame being in section. Fig. 3 is a transverse section, taken substantially on the line 3 3 of Fig. 2, and Fig. 4 is a horizontal section through the front portion of one of the stalls, illustrating the front gate of the stall in its lower position, the section being taken on the line 4 4 in Fig. 1.

In carrying out the invention one or a number of stalls A may be employed in the construction of the device, and the stalls may be built to be operated singly, in sections, or as a whole, the device, as shown in the drawings, being provided with a mechanism for simultaneously opening all of the stalls.

The framework of the series of stalls is preferably constructed of metal beams, either angled or channeled, but they may be constructed of hard wood if desired. The said frame comprises a series of front uprights 10, which are provided at the bottom with wheels 11, ordinarily of the caster type, and a top cross-bar 12, while the rear portion of the frame consists of a number of standards 13, corresponding to the number in front and connected at the top by a cross-bar 13ª, and a partition 14 is made to extend from each rear standard to its corresponding front standard, the said partitions constituting the sides of the stalls. The sides of the stalls may be padded in any approved manner, but in every event it is desirable that the padding should be placed in the front portions of the stalls, as shown in Figs. 2, 3, and 4 at the sides, in order that the horses may not see one another, and furthermore in order that the rider of a horse shall not become injured should the animal shy upon or before leaving the stall. The padded sections of the stalls are designated in the drawings as 15.

The animals are made to enter the stalls from the rear and are prevented from leaving them at this point ordinarily by closing the rear of the stalls by bars 16, hinged to the framing and provided with means for locking a bar in a closed position, the bar being so placed as to prevent an animal backing out from a stall when the bar is closed. A box 17 is placed against one rear standard 13 in each stall, the said box being partially open at one side in order that it may receive a weight 18, angular in cross-section; but a different form of weight may be used, if desired. The angular weight, however, will run freely in the box and yet will not leave the same.

Over each box 17 a pulley 19 is secured upon the rear cross-bar 13ª of the frame, and a rope, chain, or cable 20 is attached to each weight and is carried over one of the friction or guide pulleys 19 to the front of the stall in which its weight is located and over another friction or guide roller 21, preferably placed upon the top of the front cross-bar of the frame and about over the central portion of the stall. The rope, chain, or cable is then carried downward, as shown in Figs. 1 and 3, and attached, preferably, to the lower portion of the gate 22, held to slide in the front framing of the stall.

A spring 23 is attached to each gate and to an upper support, usually the front upper cross-bar, as is also shown in Figs. 1 and 3, in order that when the gate is relieved from the lock holding it in a lower position the spring will assist the weight in drawing the gate rapidly upward. Each gate 22 is held to slide in ways 24, produced in the sides of the front standards 10, and these ways are back of the front face of the standards and are substantially T-shaped in cross-section. Consequently each gate is provided at each side with a continuous rib 25, substantially T-shaped in cross-section, adapted to travel in the said ways.

It will be understood that the front portion of the slideways 24 are open.

The gates 22 are adapted to be locked in such a position as to prevent the animal in the stall from leaving it until the gate is raised, and such a lock preferably consists of a lever 26, located upon one of the front standards 10 in a single stall and upon sundry of the intermediate standards when a series of stalls is used, as shown in Fig. 1. The lower end of this lever is normally held against the standards by means of a spring 27, and the said lower end of the lever is provided with two pins 28 or their equivalents, which are made to enter openings in the standards and extend into the slideways 24, as illustrated in Fig. 4. When the gate is in its lower position, the pins will be above the top of the gate, as shown in the same figure.

Links 29 are employed to connect the upper or spring-controlled ends of the releasing-levers 26 with crank-arms 29ª formed upon a rock-shaft 30, journaled usually upon the inner face of the upper front cross-bar 12 of the frame; and this shaft is provided at the outer end with a hand-lever 31, or its equivalent, whereby it may be rocked.

The device may be rolled upon and off of the race-track by placing its wheels 11 upon suitably-formed tracks, or, as illustrated in the drawings, an extra standard 32 may be hinged to one of the front end standards 10, and in this event the extra or hinged standard 32 is made to carry a plate 33, having sliding movement on the standard and held in any desired position by means of set-screws 34. The lower end of this plate or bar is sharpened, and its top is flanged outward, in order that when the screws 34 are loosened the plate or bar may be driven into the ground, and then the set-screws are tightened. It is now evident that if the frame is in the position shown in Fig. 1, in which it is supposed to be facing the track, and the device is no longer required, the entire frame may be turned around the post or extra standard 32 as upon a pivot, and be readily taken out of the way—that is, to one side of the track.

It is necessary that the horses should be compelled or urged to leave the stalls simultaneously. This is automatically accomplished by pivoting upon the back bar 16 of each stall a rod 35, of sufficient length when brought to a horizontal position, to strike the horse at the back. This rod may be made to carry a whip, if necessary, and is held in an upright position through the medium of a spring 36. The lower end of the rod is provided with a crank-arm 35ª, which extends into a slideway or box 17 for the weight, and as the weight falls when the gate is raised the weight will strike the crank-arm 35ª and carry the rod 35 inward to a substantially horizontal position, causing it to strike the horse with more or less force. A rubber cushion 37 is placed in the bottom of each weight-box 17.

In operation, the horses having been placed in the stalls and the front gates carried downward to their lower positions, when it is desired to start the horses the rock-shaft 30 is manipulated to draw the pins of the releasing-levers 26 from out of the slideways of the front gates, whereupon the springs 23 and the weights 18 connected with the gates will cause them to rise simultaneously to such a height that the horse and its rider may readily pass out. At the same instant each animal will be struck from behind by the striking-arm 35, and consequently the horses will leave the stalls as rapidly as in their power and at the same instant.

Having thus described my invention, I claim as new and desire to secure by Letters Patent—

1. A device for starting race horses, the same consisting of a stall provided with front and rear standards, a gate adapted to slide vertically in the said front standards, a lever fulcrumed upon one of said front standards and normally holding the gate in a closed or lower position, means for raising said gate when released from the lever, a rock shaft provided with a crank arm, a link connecting the upper end of the lever with the crank arm, and means for rocking the said shaft, substantially as shown and described.

2. A device for starting race horses, the same consisting of a plurality of stalls provided with front standards, gates held to slide vertically in the front standards, levers fulcrumed upon the front standards between adjoining stalls, each lever being provided with projections at its lower end to engage the gates of two adjoining stalls when in their lower position, means for raising the gates when released from the levers and a trip device adapted to move the said levers simultaneously and release the gates, substantially as shown and described.

3. A device for starting race horses, the same consisting of a stall provided with a sliding front gate, a latch normally holding the gate in a closed position, a trip adapted to release the gate from the said latch, means for opening the gate when released from the latch, and a striker arm operated simultaneously with the opening of the gate, as and for the purpose set forth.

4. A device for starting race horses, the same consisting of a stall, a gate having sliding movement and adapted to close the forward end of the stall, a weight serving to elevate the gate, a latch acting to hold the gate in its lower or closed position, means, substantially as shown and described, for releasing the gate from the latch, and a striker arm located at the rear of the stall and operated by the said weight simultaneously with the raising or opening of the gate, as and for the purpose set forth.

5. In a device for starting race horses, the combination, with a stall and front and rear standards projected beyond the top of the stall, one of the rear standards being provided with a box, and the front standards with slideways angular in cross section, of a gate having angular ribs entering the front slideways of the stall, a releasing lever adapted to normally hold the gate in a lowered position, a trip device adapted to disengage the releasing lever from engagement with the gate, a weight held to slide in the said box at the rear of the stall, a striker arm adapted to deliver a blow upon the animal in the stall and operated by the said weight as the weight falls in opening the gate, and a cable connecting the said weight with the gate, as and for the purpose set forth.

6. In a device for starting race horses, the combination, with a stall and front and rear standards projecting upwardly therefrom, a box being formed upon one of the rear standards, the front standards being formed with slideways angular in cross section, of a gate having ribs extending into the slide-ways at the front of the stall, a weight held to travel in the rear box, a connection between the gate and weight, substantially as described, a releasing lever fulcrumed upon one of the front standards and provided with pins adapted to enter the slideway and extending over the top of the gate when in its lowered position, a trip device by means of which the releasing lever is operated, and a striker arm adapted to deliver a blow upon the horse in the stall, simultaneously with the raising of the gate, the said striker arm being spring-controlled and provided with a member extending into the path of the weight, whereby the arm is carried inward against the resistance of its spring, as and for the purpose specified.

JAMES T. ANDREW.

Witnesses:
J. W. PARSONS,
H. G. THOMPSON.